US012600876B2

(12) United States Patent　　　(10) Patent No.:　US 12,600,876 B2
　　Kida　　　　　　　　　　　　　　(45) Date of Patent:　　Apr. 14, 2026

(54) WHITE INK FOR INKJET PRINTING

(71) Applicant: KYOCERA Document Solutions Inc.,
　　　　　　　Osaka (JP)

(72) Inventor: Yukari Kida, Osaka (JP)

(73) Assignee: KYOCERA Document Solutions Inc.,
　　　　　　　Osaka (JP)

( * ) Notice:　Subject to any disclaimer, the term of this
　　　　　　　patent is extended or adjusted under 35
　　　　　　　U.S.C. 154(b) by 183 days.

(21) Appl. No.: 18/416,184

(22) Filed:　Jan. 18, 2024

(65)　　　　Prior Publication Data

US 2024/0247161 A1　　Jul. 25, 2024

(30)　　Foreign Application Priority Data

Jan. 19, 2023　(JP) ................................. 2023-006587

(51) Int. Cl.
　　*C09D 11/322*　　　(2014.01)
　　*B41J 2/01*　　　　(2006.01)
　　*B41M 5/00*　　　　(2006.01)
(52) U.S. Cl.
　　CPC .............. *C09D 11/322* (2013.01); *B41J 2/01*
　　　　　　(2013.01); *B41M 5/0023* (2013.01); *B41M*
　　　　　　　　　　　　　　　　*5/0047* (2013.01)
(58) Field of Classification Search
　　CPC ........ C09D 11/32; C09D 11/322; B41J 2/005;
　　　　　　　B41J 2/01; B41M 5/0023; B41M 5/0041;
　　　　　　　　　　　　　　　　　　B41M 5/0047
　　See application file for complete search history.

(56)　　　　References Cited

U.S. PATENT DOCUMENTS 10,550,278 B2　　2/2020　Il et al.
2014/0292902 A1 *　10/2014　Kagata ................. C09D 11/322
　　　　　　　　　　　　　　　　　　　　347/100
2018/0215935 A1　　8/2018　Il et al.
2019/0004422 A1 *　1/2019　Taguchi ................. G03F 7/031

FOREIGN PATENT DOCUMENTS

JP　　　2012219203 A　*　11/2012
JP　　　2017-039922 A　　2/2017

* cited by examiner

*Primary Examiner* — Douglas X Rodriguez
*Assistant Examiner* — Kendrick X Liu
(74) *Attorney, Agent, or Firm* — Studebaker Brackett
PLLC

(57)　　　　ABSTRACT

A white ink for inkjet printing contains titanium oxide
particles and an aqueous medium. The titanium oxide par-
ticles include anatase-type titanium oxide particles and
rutile-type titanium oxide particles. The anatase-type tita-
nium oxide particles have a percentage content of at least
17.50% by mass and no greater than 37.50% by mass in the
titanium oxide particles. The rutile-type titanium oxide
particles have a percentage content of at least 72.50% by
mass and no greater than 82.50% by mass in the titanium
oxide particles. Both the anatase-type titanium oxide par-
ticles and the rutile-type titanium oxide particles have a
number average primary particle diameter of at least 140 nm
and no greater than 340 nm.

8 Claims, No Drawings

WHITE INK FOR INKJET PRINTING

INCORPORATION BY REFERENCE

The present application claims priority under 35 U.S.C. § 119 to Japanese Patent Application No. 2023-006587, filed on Jan. 19, 2023. The contents of this application are incorporated herein by reference in their entirety.

BACKGROUND

The present disclosure relates to a white ink for inkjet printing.

Typically, recording media such as flexible packaging (e.g., resin film) used in inkjet printing are transparent. When printing on such a transparent recording medium with a typical color ink for inkjet printing, opacity of a formed image may be insufficient and the printed portion may be difficult to see. As such, in order to ensure opacity of an image formed by inkjet printing on the flexible packaging, an underlying layer may be formed with a white ink for inkjet printing followed by printing on the underlying layer with the color ink for inkjet printing. Due to being used for the purpose such as above, the white ink for inkjet printing is required to be capable of forming images with high whiteness and opacity. When there are projections and recesses on the surface of the underlying layer, it is difficult to print on the underlying layer with a color ink for inkjet printing. As such, the white ink for inkjet printing is also required to be capable of forming images with high surface smoothness. In addition, the white ink for inkjet printing is further required to have excellent preservation stability.

Typically, the recording media such as flexible packaging used in inkjet printing are glossy. In inkjet printing on glossy recording media such as above, it is desirable to impart gloss to formed images in order to avoid creating a sense of discomfort in the printed area. As such, the white ink for inkjet printing is required to be capable of forming images with high glossiness. To meet the above requirements, a white ink for inkjet printing is proposed that contains titanium oxide particles and a pigment dispersion with a specific structure, for example.

SUMMARY

A white ink for inkjet printing according to an aspect of the present disclosure contains titanium oxide particles and an aqueous medium. The titanium oxide particles include anatase-type titanium oxide particles and rutile-type titanium oxide particles. The anatase-type titanium oxide particles have a percentage content of at least 17.50% by mass and no greater than 37.50% by mass in the titanium oxide particles. The rutile-type titanium oxide particles have a percentage content of at least 72.50% by mass and no greater than 82.50% by mass in the titanium oxide particles. Both the anatase-type titanium oxide particles and the rutile-type titanium oxide particles have a number average primary particle diameter of at least 140 nm and no greater than 340 nm. A ratio of major axis length to minor axis length of the anatase-type titanium oxide particles and a ratio of major axis length to minor axis length of the rutile-type titanium oxide particles each are at least 2 and no greater than 17.

DETAILED DESCRIPTION

The following describes embodiments of the present disclosure. In the following, the number average primary particle diameter of titanium oxide particles and the ratio of major axis length to minor axis length of the titanium oxide particles were measured using a scanning electron microscope (TEM) (e.g., "JEM-2000FX", product of JEOL Ltd.). Note that the number average primary particle diameter of the titanium oxide particles was obtained in a manner that a photograph taken using the TEM was analyzed using image analysis software ("WINROOF", product of MITANI CORPORATION) to calculate a number average of equivalent circle diameters of the titanium oxide particles and the obtained value was taken as the number average primary particle diameter of the titanium oxide particles. Specifically, the number average primary particle diameter of the titanium oxide particles and the ratio of the major axis length to the minor axis length of the titanium oxide particles are values as measured by the method described in Examples or a method in conformity therewith.

Measurement values for volume median diameter (D50) are values as measured using a dynamic light scattering type particle size distribution analyzer (e.g., "NANOTRAC (registered Japanese trademark) WAVE II-EX150", product of MicrotracBEL Corp.) unless otherwise stated.

In the present specification, the term "(meth)acryl" may be used as a generic term for both acryl and methacryl. One type of each component described in the present specification may be used independently, or two or more types of the component may be used in combination.

<White Ink for Inkjet Printing>

A white ink for inkjet printing (also referred to below as an ink) according to an embodiment of the present disclosure contains titanium oxide particles and an aqueous medium. The titanium oxide particles include anatase-type titanium oxide particles and rutile-type titanium oxide particles. The anatase-type titanium oxide particles have a percentage content of at least 17.50% by mass and no greater than 37.50% by mass in the titanium oxide particles. The rutile-type titanium oxide particles have a percentage content of at least 72.50% by mass and no greater than 82.50% by mass in the titanium oxide particles. Both the anatase-type titanium oxide particles and the rutile-type titanium oxide particles have a number average primary particle diameter of at least 140 nm and no greater than 340 nm. A ratio of the major axis length to the minor axis length of the anatase-type titanium oxide particles and a ratio of the major axis length to the minor axis length of the rutile-type titanium oxide particles each are at least 2 and no greater than 17. Preferably, the ink according to the present embodiment further contains either or both a pigment dispersion resin and binder resin particles.

The ink according to the present embodiment is suitable for image formation on non-permeable recording media (especially, flexible packaging). The non-permeable recording media are inferior in ink permeability to permeable recording media. In the non-permeable recording media, the absorption amount of an aqueous medium is no greater than 1.0 g/m², for example. Examples of the non-permeable recording media include resin-made recording media, metal-made recording media, and glass-made recording media. Examples of the resin-made recording media include resin sheets and resin films. The resin contained in the resin-made recording media is preferably a thermoplastic resin. Specific examples of the resin include polyethylene, polypropylene, polyvinyl chloride, and polyethylene terephthalate (PET). Examples of the resin-made recording media include OPP films and PET films. In image formation on a resin-made recording medium with the ink according to the present embodiment, the surface (printing surface) of the recording medium may be subjected to corona discharge treatment.

The ink according to the present embodiment is preferably used in front printing. The front printing herein means printing on a surface on the front side (the side that is visible to a viewer) of a transparent recording medium when printing on the transparent recording medium. When the viewer views a recording medium on which front printing has been done, the positional relationship "the viewer, an image, and the recording medium" is established and the image is directly viewed by the viewer. Therefore, images formed by front printing tend to require particularly high glossiness.

Note that printing on a surface on the back side (the side opposite to the side that is visible to a viewer) of a transparent recording medium refers to reverse printing in printing on the transparent recording medium. When the viewer views a recording medium on which reverse printing has been done, the positional relationship "the viewer, the recording medium, and an image" is established and the image is viewed by the viewer through the recording medium. Therefore, images formed by reverse printing tend not to require such high glossiness.

As a result of having the above features, the ink according to the present embodiment has excellent preservation stability and can form images with high whiteness, opacity, glossiness, and surface smoothness. Note that images with high whiteness in the present specification means images that have high lightness and that do not have a yellowish tinge. The reasons why the ink according to the present embodiment can exert the above advantages can be inferred as follows.

The characteristics of the titanium oxide particles are described first. A closer diameter of the titanium oxide particles to the half wavelength of incident light tends to impart higher lightness and opacity to images formed with the ink. For example, an image formed with titanium oxide particles with a particle diameter of 200 nm exhibits particularly high lightness and opacity to incident light with a wavelength of 400 nm. Therefore, images containing titanium oxide particles with a particle diameter close to the half wavelength of visible light (e.g., titanium oxide particles with a number average primary particle diameter of at least 140 nm and no greater than 340 nm) have high lightness and opacity. There are three types of titanium oxide particles: anatase-type titanium oxide particles; rutile-type titanium oxide particles; and brookite-type titanium oxide particles. Among these types, the rutile-type titanium oxide particles are typically used in known inks. The rutile-type titanium oxide particles can impart high lightness and opacity to formed images. However, the rutile-type titanium oxide particles are characterized by a slightly yellowish tinge. By contrast, the anatase-type titanium oxide particles are characteristically not so yellowish although they impart somewhat insufficient lightness and opacity.

The ink according to the present embodiment contains the anatase-type titanium oxide particles and the rutile-type titanium oxide particles each in a specific percentage content as a white pigment. As a result, images formed with the ink according to the present embodiment have excellent lightness and opacity derived from the rutile-type titanium oxide particles, and has a reduced yellow tinge due to presence of the anatase-type titanium oxide particles. The titanium oxide particles contained in the ink according to the present embodiment, which have a number average primary particle diameter of at least 140 nm and no greater than 340 nm, readily impart whiteness and opacity to formed images. As a result, the ink according to the present embodiment can form images with high whiteness and opacity. Titanium oxide particles with an excessively large particle diameter (e.g., titanium oxide particles with a number average primary particle diameter of greater than 340 nm) tend to reduce preservation stability of inks. However, both the anatase-type titanium oxide particles and the rutile-type titanium oxide particles have a number average primary particle diameter of no greater than 340 nm in the ink according to the present embodiment. As such, the titanium oxide particles in the ink are not excessively large. Therefore, the toner according to the present embodiment has excellent preservation stability.

The ratio of the major axis length to the minor axis length of the anatase-type titanium oxide particles and the ratio of the major axis length to the minor axis length of the rutile-type titanium oxide particles each are at least 2 and no greater than 17 in the ink according to the present embodiment. That is, the ink according to the present embodiment contains plate-shaped flat titanium oxide particles (specifically, plate-shaped flat anatase-type titanium oxide particles and plate-shaped flat rutile-type titanium oxide particles) as the titanium oxide particles. The plate-shaped flat titanium oxide particles readily impart smoothness to the surfaces of images formed with the ink. The images with the smooth surfaces tend to exhibit gloss. As such, images formed with the ink according to the present embodiment have high surface smoothness and glossiness. Details of the ink according to the present embodiment are further described below.

[Titanium Oxide Particles]

The ink according to the present embodiment contains titanium oxide particles as a white pigment. The titanium oxide particles include anatase-type titanium oxide particles and rutile-type titanium oxide particles. The ink according to the present embodiment preferably contains no additional pigment other than the titanium oxide particles. Specifically, the percentage content of the additional pigment other than the titanium oxide particles is preferably no greater than 1.00% by mass in the ink according to the present embodiment, more preferably no greater than 0.10% by mass, and further preferably 0.00% by mass.

The titanium oxide particles have a percentage content of at least 5.00% by mass and no greater than 25.00% by mass in the ink according to the present embodiment, and more preferably at least 10.00% by mass and no greater than 20.00% by mass. As a result of the percentage content of the titanium oxide particles in the ink according to the present embodiment being set to at least 5.00% by mass, further favorable whiteness and opacity can be imparted to images formed with the ink. As a result of the percentage content of the titanium oxide particles in the ink according to the present embodiment being set to no greater than 25.00% by mass, favorable ejection performance can be imparted to the ink.

(Anatase-Type Titanium Oxide Particles)

The anatase-type titanium oxide particles reduce yellowness of images formed with the ink according to the present embodiment. The anatase-type titanium oxide particles have a percentage content of at least 17.50% by mass and no greater than 37.50% by mass in the titanium oxide particles, and more preferably at least 22.00% by mass and no greater than 32.00% by mass. As a result of the percentage content of the anatase-type titanium oxide particles in the titanium oxide particles being set to at least 17.50% by mass, yellowness of images formed with the ink according to the present embodiment can be reduced. As a result of the percentage content of the anatase-type titanium oxide particles in the titanium oxide particles being set to no greater than 37.50% by mass, high lightness and opacity can be imparted to images formed with the ink according to the present embodiment.

The anatase-type titanium oxide particles have a number average primary particle diameter of preferably at least 140 nm and no greater than 340 nm, more preferably at least 165 nm and no greater than 310 nm, and further preferably at least 210 nm and no greater than 280 nm. As a result of the number average primary particle diameter of the anatase-type titanium oxide particles being set to at least 140 nm, the ink according to the present embodiment can impart further high whiteness and opacity to formed images. As a result of the number average primary particle diameter of the anatase-type titanium oxide particles being set to no greater than 340 nm, the ink according to the present embodiment can exhibit further excellent preservation stability.

The anatase-type titanium oxide particles have a percentage content of preferably at least 1.50% by mass and no greater than 7.00% by mass in the ink according to the present embodiment, and more preferably at least 2.50% by mass and no greater than 5.50% by mass. As a result of the percentage content of the anatase-type titanium oxide particles in the ink according to the present embodiment being set to at least 1.50% by mass, yellowness of images formed with the ink can be further effectively reduced. As a result of the percentage content of the anatase-type titanium oxide particles in the ink according to the present embodiment being set to no greater than 7.00% by mass, further favorable lightness and opacity can be imparted to images formed with the ink.

Note that the total percentage content of the anatase-type titanium oxide particles and the rutile-type titanium oxide particles is preferably at least 90.00% by mass in the titanium oxide particles, more preferably at least 99.00% by mass, and further preferably 100.00% by mass.

Analysis for determining whether the titanium oxide particles are the anatase-type titanium oxide particles or the rutile-type titanium oxide particles can be performed by TEM-EELS which is a combination of transmission electron microscopy (TEM) and electron energy loss spectroscopy (EELS), for example.

The ratio of the major axis length to the minor axis length of the anatase-type titanium oxide particles is preferably at least 2 and no greater than 17, more preferably at least 3 and no greater than 17, further preferably at least 3 and no greater than 15, further more preferably at least 5 and no greater than 10, and particularly preferably at least 6 and no greater than 8. As a result of the ratio of the major axis length to the minor axis length of the anatase-type titanium oxide particles being set to at least 2, further high glossiness and surface smoothness can be imparted to images formed with the ink according to the present embodiment. As a result of the ratio of the major axis length to the minor axis length of the anatase-type titanium oxide particles being set to no greater than 17, further excellent preservation stability can be imparted to the ink according to the present embodiment.
(Rutile-Type Titanium Oxide Particles)

The rutile-type titanium oxide particles impart sufficient lightness and opacity to images formed with the ink according to the present embodiment. The rutile-type titanium oxide particles have a percentage content of at least 62.50% by mass and no greater than 82.50% by mass in the titanium oxide particles, and more preferably at least 68.00% by mass and no greater than 78.00% by mass. As a result of the percentage content of the rutile-type titanium oxide particles in the titanium oxide particles being set to at least 62.50% by mass, high lightness and opacity can be imparted to images formed with the ink according to the present embodiment. As a result of the percentage content of the rutile-type titanium oxide particles in the titanium oxide particles being set to no greater than 82.50% by mass, yellowness of images formed with the ink according to the present embodiment can be reduced.

The rutile-type titanium oxide particles have a number average primary particle diameter of preferably at least 140 nm and no greater than 340 nm, more preferably at least 190 nm and no greater than 310 nm, and further preferably at least 220 nm and no greater than 280 nm. As a result of the number average primary particle diameter of the rutile-type titanium oxide particles being set to at least 140 nm, the ink according to the present embodiment can impart further high whiteness and opacity to formed images. As a result of the number average primary particle diameter of the rutile-type titanium oxide particles being set to no greater than 340 nm, the ink according to the present embodiment can exhibit further excellent preservation stability.

The number average primary particle diameter of the rutile-type titanium oxide particles is preferably greater than the number average primary particle diameter of the anatase-type titanium oxide particles. Specifically, a value obtained by subtracting the number average primary particle diameter of the anatase-type titanium oxide particles from the number average primary particle diameter of the rutile-type titanium oxide particles is preferably at least 10 nm and no greater than 180 nm, and more preferably at least 15 nm and no greater than 40 nm.

The rutile-type titanium oxide particles have a percentage content of at least 7.00% by mass and no greater than 16.00% by mass in the ink according to the present embodiment, and more preferably at least 9.50% by mass and no greater than 12.50% by mass. As a result of the percentage content of the rutile-type titanium oxide particles in the ink according to the present embodiment being set to at least 7.00% by mass, further favorable lightness and opacity can be imparted to images formed with the ink. As a result of the percentage content of the rutile-type titanium oxide particles in the ink according to the present embodiment being set to no greater than 16.00% by mass, yellowness of images formed with the ink can be further effectively reduced.

The ratio of the major axis length to the minor axis length of the rutile-type titanium oxide particles is preferably at least 2 and no greater than 17, more preferably at least 3 and no greater than 17, further preferably at least 3 and no greater than 15, further more preferably at least 5 and no greater than 12, still further preferably at least 5 and no greater than 10, and particularly preferably at least 6 and no greater than 8. As a result of the ratio of the major axis length to the minor axis length of the rutile-type titanium oxide particles being set to at least 2, high glossiness and surface smoothness can be imparted to images formed with the ink according to the present embodiment. As a result of the ratio of the major axis length to the minor axis length of the rutile-type titanium oxide particles being set to no greater than 17, further excellent preservation stability can be imparted to the ink according to the present embodiment.
(Pigment Dispersion Resin)

The pigment dispersion resin attaches to the surfaces of the titanium oxide particles to optimize dispersion stability of the titanium oxide particles in the aqueous medium. Note that a portion of the pigment dispersion resin may be free in the ink without attaching to the surfaces of the titanium oxide particles. Examples of the pigment dispersion resin include polyether resin, (meth)acrylic resin, styrene-(meth) acrylic resin, and styrene-maleic acid resin.

The pigment dispersion resin has a percentage content of at least 1.00% by mass and no greater than 10.00% by mass in the ink according to the present embodiment, and more preferably at least 3.00% by mass and no greater than 6.00% by mass. As a result of the percentage content of the pigment dispersion resin being set to at least 1.00% by mass, dispersion stability of the titanium oxide particles in the aqueous medium can be further optimized. As a result of the percentage content of the pigment dispersion resin being set to no greater than 10.00% by mass, excellent ejection performance can be imparted to the ink according to the present embodiment.

The ink according to the present embodiment has a ratio of the mass of the pigment dispersion resin to the mass of the titanium oxide particles of preferably at least 0.10 and no greater than 0.50, and more preferably at least 0.25 and no greater than 0.35. As a result of the ratio of the mass of the pigment dispersion resin to the mass of the titanium oxide particles being set to at least 0.10 and no greater than 0.50, dispersion stability of the titanium oxide particles in the aqueous medium can be further optimized.

[Aqueous Medium]

The aqueous medium contained in the ink according to the present embodiment is a medium containing water. The aqueous medium may function as a solution medium or a dispersion medium. A specific example of the aqueous medium is an aqueous medium containing water and a water-soluble organic solvent.

(Water)

The water has a percentage content of at least 25.00% by mass and no greater than 80.00% by mass in the ink according to the present embodiment, and more preferably at least 30.00% by mass and no greater than 60.00% by mass.

(Water-Soluble Organic Solvent)

Examples of the water-soluble organic solvent include glycol compounds, glycol ether compounds, lactam compounds, nitrogen-containing compounds, acetate compounds, thiodiglycol, glycerin, and dimethyl sulfoxide.

Examples of the glycol compounds include ethylene glycol, 1,3-propanediol, propylene glycol, 1,2-pentanediol, 1,5-pentanediol, 1,2-octanediol, 1,8-octanediol, 3-methyl-1, 3-butanediol, 3-methyl-1,5-pentanediol, diethylene glycol, triethylene glycol, and tetraethylene glycol. A preferable glycol compound is propylene glycol.

Examples of the glycol ether compounds include diethylene glycol diethyl ether (diethyl diglycol), diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether. A preferable glycol ether compound is triethylene glycol monobutyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

The water-soluble organic solvent is preferably a glycol compound or a glycol ether compound, and more preferably propylene glycol or triethylene glycol monobutyl ether.

The water-soluble organic solvent has a percentage content of at least 20.00% by mass and no greater than 60.00% by mass in the ink according to the present embodiment, and more preferably at least 35.00% by mass and no greater than 45.00% by mass.

The percentage content of the glycol compound is preferably at least 15.00% by mass and no greater than 50.00% by mass in the ink according to the present embodiment, and more preferably at least 25.00% by mass and no greater than 35.00% by mass.

The glycol ether compound has a percentage content of at least 3.00% by mass and no greater than 20.00% by mass in the ink according to the present embodiment, and more preferably at least 7.00% by mass and no greater than 15.00% by mass.

Preferably, the ink according to the present embodiment contains as the aqueous medium only water, propylene glycol, and triethylene glycol monobutyl ether. The total percentage content of the water, propylene glycol, and triethylene glycol monobutyl ether is preferably at least 90% by mass in the aqueous medium, more preferably at least 99% by mass, and further preferably 100% by mass.

(Binder Resin Particles)

The binder resin particles are present in a dispersed state in the aqueous medium. The binder resin particles function as a binder in images formed with the ink according to the present embodiment to optimize fixability of the titanium oxide particles to recording media.

Examples of the resin contained in the binder resin particles include urethane resin, (meth)acrylic resin, styrene-(meth)acrylic resin, styrene-maleic acid copolymers, vinylnaphthalene-(meth)acrylic acid copolymers, and vinylnaphthalene-maleic acid copolymers. Urethane resin is preferable as the resin contained in the binder resin particles. The percentage content of the urethane resin is preferably at least 80% by mass in the binder resin particles, and more preferably 100% by mass.

The binder resin particles have a volume median diameter (D50) of preferably at least 10 nm and no greater than 500 nm, and more preferably at least 10 nm and no greater than 100 nm.

The binder resin particles have a percentage content of at least 0.50% by mass and no greater than 10.00% by mass in the ink according to the present embodiment, and more preferably at least 2.00% by mass and no greater than 5.00% by mass. As a result of the percentage content of the binder resin particles being set to at least 0.50% by mass, fixability of the titanium oxide particles to recording media can be further optimized. As a result of the percentage content of the binder resin particles being set to no greater than 10.00% by mass, ejection performance of the ink according to the present embodiment can be optimized.

(Surfactant)

Preferably, the ink according to the present embodiment further contains a surfactant. The surfactant optimizes compatibility and dispersion stability of each component contained in the ink according to the present embodiment. Furthermore, the surfactant imparts to the ink according to the present embodiment wettability to recording media. The surfactant in the ink according to the present embodiment is preferably a nonionic surfactant.

Examples of the nonionic surfactant in the ink according to the present embodiment include acetylene glycol surfactants (surfactants containing an acetylene glycol compound), silicone surfactants (surfactants containing a silicone compound), and fluorine surfactants (surfactants containing fluororesin or a fluorine-containing compound). Examples of the acetylene glycol surfactants include ethylene oxide adducts of acetylene glycol and propylene oxide adducts of acetylene glycol.

The surfactant has a percentage content of preferably at least 0.10% by mass and no greater than 3.00% by mass in the ink according to the present embodiment, and more preferably at least 0.50% by mass and no greater than 1.50% by mass.

(Base Component)

Preferably, the ink according to the present embodiment further contains a base component. Examples of the base component include sodium hydroxide and potassium hydroxide. Preferably, the base component has a percentage content of at least 0.001% by mass and no greater than 0.010% by mass in the ink according to the present embodiment.

[Optional Component]

The ink according to the present embodiment may further contain any known additives (specific examples include a solution stabilizer, an anti-drying agent, an antioxidant, a viscosity modifier, a pH adjuster, and an antifungal agent) as necessary.

[Preferable Material Combination]

In order to provide a white ink for inkjet printing that has excellent preservation stability and that can form images with high whiteness, opacity, glossiness, and surface smoothness, Conditions 1 or Conditions 2 are preferably satisfied and it is further preferable that Conditions 3 or Conditions 4 are satisfied.

Conditions 1: the number average primary particle diameter of the rutile-type titanium oxide particles is at least 330 nm and no greater than 340 nm; the number average primary particle diameter of the anatase-type titanium oxide particles is at least 140 nm and no greater than 340 nm; the ratios of the major axis length to the minor axis length of the anatase-type titanium oxide particles and the rutile-type titanium oxide particles each are at least 5 and no greater than 10; the percentage content of the anatase-type titanium oxide particles is at least 22.00% by mass and no greater than 32.00% by mass in the titanium oxide particles; and the percentage content of the rutile-type titanium oxide particles is at least 68.00% by mass and no greater than 78.00% by mass in the titanium oxide particles.

Conditions 2: the number average primary particle diameters of the anatase-type titanium oxide particles and the rutile-type titanium oxide particles each are at least 210 nm and no greater than 280 nm; the ratio of the major axis length to the minor axis length of the anatase-type titanium oxide particles is at least 5 and no greater than 10; the ratio of the major axis length to the minor axis length of the rutile-type titanium oxide particles is at least 5 and no greater than 12; the percentage content of the anatase-type titanium oxide particles is at least 22.00% by mass and no greater than 32.00% by mass in the titanium oxide particles; and the percentage content of the rutile-type titanium oxide particles is at least 62.50% by mass and on greater than 82.50% by mass in the titanium oxide particles.

Conditions 3: under Conditions 1, the number average primary particle diameter of the anatase-type titanium oxide particles is at least 140 nm and no greater than 170 nm or at least 330 nm and no greater than 340 nm.

Conditions 4: under Conditions 2, the ratio of the major axis length to the minor axis length of the rutile-type titanium oxide particles is at least 5 and no greater than 10 and the percentage content of the rutile-type titanium oxide particles is at least 80.00% by mass and no greater than 82.50% by mass in the titanium oxide particles; or the ratio of the major axis length to the minor axis length of the rutile-type titanium oxide particles is at least 12 and no greater than 15 and the percentage content of the rutile-type titanium oxide particles is at least 68.00% by mass and no greater than 78.00% by mass in the titanium oxide particles.

[Ink Production Method]

The ink according to the present embodiment can be produced for example by mixing an anatase-type titanium oxide particle dispersion containing the anatase-type titanium oxide particles, a rutile-type titanium oxide particle dispersion containing the rutile-type titanium oxide particles, the aqueous medium, and any optional components (e.g., the surfactant, a dispersion containing the binder resin particles, and an aqueous solution containing the base component) added as necessary. In production of the ink according to the present embodiment, uniform mixing of each component may be followed by removal of foreign matter and coarse particles using a filter (e.g., a filter with a pore size of no greater than 5 μm).

For example, the anatase-type titanium oxide particle dispersion or the rutile-type titanium oxide particle dispersion can be prepared by wet dispersion of water, the pigment dispersion resin added as necessary, and the anatase-type titanium oxide particles or the rutile-type titanium oxide particles using a bead mill or the like.

EXAMPLES

The following describes examples of the present disclosure. However, the present disclosure is not limited to the following examples.

[Ratio of Major Axis Length to Minor Axis Length]

The term "major axis length/minor axis length ratio" in the present specification refers to a ratio of the major axis length to the minor axis length of titanium oxide particles. The number average primary particle diameter and the major axis length/minor axis length ratio of the titanium oxide particles were measured using a transmission electron microscope (TEM, "JEM-2000FX", product of JEOL Ltd.). For image capturing, the accelerating voltage was set to 80 kV and the magnification was set to 30,000×. In the image capturing, the major axis lengths and the minor axis lengths of 10 particles randomly selected from each type of the titanium oxide particles in a field of view were measured. Next, an arithmetic mean (average major axis length) of the measured major axis lengths and an arithmetic mean (average minor axis length) of the measured minor axis lengths of the 10 particles were calculated. A value obtained by dividing the average major axis length by the average minor axis length was taken as a major axis length/minor axis length ratio of the titanium oxide particles present in the measured field of view. The above measurement was carried out in 10 fields of view. An arithmetic mean of the major axis length/ minor axis length ratios of the titanium oxide particles measured in the fields of view was adopted as a measurement value of the major axis length/minor axis length ratio of the titanium oxide particles to be a measurement target.

Note that the "major axis length" was defined as the distance between two virtual parallel lines that could sandwich a particle of the measurement target and that were set so that the distance therebetween was the maximum. The "minor axis length" was defined as the width of a portion of the particle of the measurement target that intersected with a third virtual parallel line set to be equidistant from each of the two virtual parallel lines.

[Number Average Primary Particle Diameter]

The number average primary particle diameter of the titanium oxide particles was calculated through analysis of the photograph captured by the TEM using image analysis software ("WINROOF", product of MITANI CORPORATION). In the image analysis, a number average of the equivalent circle diameters of 100 randomly selected titanium oxide particles was calculated and the calculated value was taken as the number average primary particle diameter of the titanium oxide particles.

[Preparation of Anatase-Type Titanium Oxide Particle Dispersions (A1) to (A11)]

Anatase-type titanium oxide particle dispersions (A1) to (A11) were prepared by the following methods. In the preparation of the anatase-type titanium oxide particle dispersions (A1) to (A11), anatase-type titanium oxide particles (a1) to (a11) shown below in Table 1 were used. In Table 1 below, "a/b" refers to a ratio (major axis length/minor axis length) of a major axis length (a) to a minor axis length (b). The same applies to Tables 2 and 4 below.

(Anatase-Type Titanium Oxide Particle Dispersion (A1))

A mixture was obtained by mixing 50.0 parts by mass of the anatase-type titanium oxide particles (a1) (number average primary particle diameter 100 nm, major axis length/minor axis length ratio=7), 14.5 parts by mass of a pigment dispersion resin ("SOLSPERSE (registered Japanese trademark) W100", product of Lubrizol Japan Limited, main component: polyether-based resin), and 35.5 parts by mass of water. Dispersion treatment was carried out on the resultant mixture for 60 minutes using a bead mill ("RESEARCH LAB", product of Shinmaru Enterprises Corporation). In the dispersion treatment, zirconia beads with a diameter of 1.0 mm were charged into a vessel of the bead mill to achieve a loading rate of 70% by volume. Also in the dispersion treatment, the treatment speed was set to 8 m/sec. In the manner described above, an anatase-type titanium oxide particle dispersion (A1) (volume median diameter (D50) of anatase-type titanium oxide particles: 100 nm, anatase-type titanium oxide particle concentration: 50% by mass) was produced.

(Anatase-Type Titanium Oxide Particle Dispersions (A2) to (A11))

Anatase-type titanium oxide particle dispersions (A2) to (A11) (anatase-type titanium oxide particle concentration: 50% by mass) were prepared according to the same method as that for preparing the anatase-type titanium oxide particle dispersion (A1) in all aspects other than that the type of the anatase-type titanium oxide particles used was changed to those shown below in Table 1. Note that in the preparation of the titanium oxide particle dispersions (A1) to (A11), the titanium oxide particles were classified as necessary to have a corresponding $D_{50}$ shown below in Table 1.

TABLE 1

| Dispersion | Titanium oxide particles | $D_{50}$ [nm] | a/b | Manufacturer | Product name |
|---|---|---|---|---|---|
| A1 | a1 | 100 | 7 | SAKAI CHEMICAL INDUSTRY CO., LTD. | A-190 |
| A2 | a2 | 150 | 7 | SAKAI CHEMICAL INDUSTRY CO., LTD. | A-190 |
| A3 | a3 | 330 | 7 | TAYCA CORPORATION | JA-C |
| A4 | a4 | 350 | 7 | TAYCA CORPORATION | JA-C |
| A5 | a5 | 250 | 7 | TAYCA CORPORATION | JA-C |
| A6 | a6 | 250 | 1 | ISHIHARA SANGYO KAISHA, LTD. | W-10 |
| A7 | a7 | 250 | 3 | ISHIHARA SANGYO KAISHA, LTD. | A-220 |
| A8 | a8 | 250 | 2 | ISHIHARA SANGYO KAISHA, LTD. | A-100 |
| A9 | a9 | 250 | 5 | TAYCA CORPORATION | JA-1 |
| A10 | a10 | 170 | 7 | SAKAI CHEMICAL INDUSTRY CO., LTD. | A-190 |
| A11 | a11 | 330 | 7 | TAYCA CORPORATION | JA-C |

[Preparation of Rutile-Type Titanium Oxide Particle Dispersions (B1) to (B11)]

Rutile-type titanium oxide particle dispersions (B1) to (B11) (rutile-type titanium oxide particle concentration: 50% by mass) were prepared according to the same method as that for preparing the anatase-type titanium oxide particle dispersion (A1) in all aspects other than that the type of the titanium oxide particles used was changed to rutile-type titanium oxide particles (b1) to (b11) shown below in Table 2. Note that in the preparation of the rutile-type titanium oxide particle dispersions (B1) to (B11), the titanium oxide particles were classified as necessary to have a corresponding $D_{50}$ shown below in Table 2.

TABLE 2

| Dispersion | Titanium oxide particles | $D_{50}$ [nm] | a/b | Manufacturer | Product name |
|---|---|---|---|---|---|
| B1 | b1 | 130 | 7 | TAYCA CORPORATION | JR-605 |
| B2 | b2 | 170 | 7 | TAYCA CORPORATION | JR-605 |
| B3 | b3 | 330 | 7 | TAYCA CORPORATION | JR-301 |
| B4 | b4 | 350 | 7 | TAYCA CORPORATION | JR-301 |
| B5 | b5 | 250 | 7 | TAYCA CORPORATION | JR-301 |
| B6 | b6 | 250 | 1 | ISHIHARA SANGYO KAISHA, LTD. | PT-301 |
| B7 | b7 | 250 | 3 | TAYCA CORPORATION | JR-603 |
| B8 | b8 | 250 | 5 | TAYCA CORPORATION | JR-405 |
| B9 | b9 | 250 | 12 | TAYCA CORPORATION | JR-805 |
| B10 | b10 | 330 | 7 | TAYCA CORPORATION | JR-301 |
| B11 | b11 | 170 | 15 | TAYCA CORPORATION | JR-701 |

[Binder Resin Particle Dispersion]

As a binder resin particle dispersion, "UPUD-ST-053D" produced by UBE corporation was used. "UPUD-ST-053D" produced by UBE Corporation was a dispersion (urethane resin particle concentration: 30% by mass) containing urethane resin particles and water.

<Ink Preparation>

Inks (I-1) to (I-14) of Examples 1 to 9 and Comparative Examples 1 to 5 were prepared by the following methods.

[Ink (I-1)]

First, 30.00 parts by mass of propylene glycol, 10.00 parts by mass of triethylene glycol monobutyl ether, 1.00 part by mass of a surfactant ("SURFYNOL (registered Japanese trademark) 104", product of Nissin Chemical Industry Co., Ltd., acetylene glycol surfactant), 0.50 parts by mass of a 1% by mass sodium hydroxide aqueous solution, 7.50 parts by mass of the anatase-type titanium oxide particle dispersion (A1) (containing 3.75 parts by mass of the anatase-type titanium oxide particles (a1)), 22.50 parts by mass of the rutile-type titanium oxide particle dispersion (B1) (containing 11.25 parts by mass of the rutile-type titanium oxide particles (b1)), 11.67 parts by mass of the binder resin particle dispersion (containing binder resin particles 3.50 parts by mass), and water were weighted into a beaker. The amount of the water used was an amount (e.g., 16.83 parts by mass in an ink (I-1)) that gave the mass of the beaker contents 100.00 parts by mass in total. The beaker contents were stirred at a rotational speed of 400 rpm using a stirrer ("THREE-ONE MOTOR BL-600", product of Shinto Scientific Co., Ltd.) to uniformly mix the beaker contents, thereby obtaining a mixed liquid. The mixed liquid was filtered using a filter (pore size 5 μm) to remove foreign matter and coarse particles contained in the mixed liquid. Through the above, the ink (I-1) of Comparative Example 1 was obtained.

[Inks (I-2) to (I-14)]

Inks (I-2) to (I-14) of Examples 1 to 9 and Comparative Examples 2 to 5 were prepared according to the same method as that for preparing the ink (I-1) in all aspects other than that the type and amount of the titanium oxide particle dispersion used were changed to those shown below in Table 3. Table 3 below also shows the types and percentage contents of the titanium oxide particles contained in the respective inks.

TABLE 3

| | Ink | Titanium oxide particle dispersion | | | | Titanium oxide particles | | | |
|---|---|---|---|---|---|---|---|---|---|
| | | Anatase type | | Rutile type | | Anatase type | | Rutile type | |
| | | Type | Part by mass | Type | Part by mass | Type | % by mass | Type | % by mass |
| Comparative Example 1 | I-1 | A1 | 7.50 | B1 | 22.50 | a1 | 3.75 | b1 | 11.25 |
| Example 1 | I-2 | A2 | 7.50 | B2 | 22.50 | a2 | 3.75 | b2 | 11.25 |
| Example 2 | I-3 | A3 | 7.50 | B3 | 22.50 | a3 | 3.75 | b3 | 11.25 |
| Comparative Example 2 | I-4 | A4 | 7.50 | B4 | 22.50 | a4 | 3.75 | b4 | 11.25 |
| Comparative Example 3 | I-5 | A5 | 4.50 | B5 | 25.50 | a5 | 2.25 | b5 | 12.75 |
| Example 3 | I-6 | A5 | 6.00 | B5 | 24.00 | a5 | 3.00 | b5 | 12.00 |
| Example 4 | I-7 | A5 | 10.50 | B5 | 19.50 | a5 | 5.25 | b5 | 9.75 |
| Comparative Example 4 | I-8 | A5 | 12.00 | B5 | 18.00 | a5 | 6.00 | b5 | 9.00 |
| Comparative Example 5 | I-9 | A6 | 7.50 | B6 | 22.50 | a6 | 3.75 | b6 | 11.25 |
| Example 5 | I-10 | A7 | 7.50 | B7 | 22.50 | a7 | 3.75 | b7 | 11.25 |
| Example 6 | I-11 | A8 | 7.50 | B8 | 22.50 | a8 | 3.75 | b8 | 11.25 |
| Example 7 | I-12 | A9 | 7.50 | B9 | 22.50 | a9 | 3.75 | b9 | 11.25 |
| Example 8 | I-13 | A10 | 7.50 | B10 | 22.50 | a10 | 3.75 | b10 | 11.25 |
| Example 9 | I-14 | A11 | 7.50 | B11 | 22.50 | a11 | 3.75 | b11 | 11.25 |

Table 4 below shows, for each of the inks, the particle diameters and the major axis length/minor axis length ratios (a/b) of the anatase-type titanium oxide particles and the rutile-type titanium oxide particles, and the proportions of the anatase-type titanium oxide particles and the rutile-type titanium oxide particles when the total amount of the titanium oxide particles is 100% by mass.

Note that "particle diameter" for the anatase-type titanium oxide particles below in Table 4 refers to a number average primary particle diameter of corresponding anatase-type titanium oxide particles. The number average primary particle diameters of the anatase-type titanium oxide particles in the produced inks (I-1) to (I-14) are approximately equivalent to the volume median diameter (D50) of the anatase-type titanium oxide particles in the anatase-type titanium oxide particle dispersions (A1) to (A11), respectively, used as raw materials shown in Table 1. Also, the volume median diameters ($D_{50}$) of the anatase-type titanium oxide particles in the anatase-type titanium oxide particle dispersions (A1) to (A11) used for production of the inks (I-1) to (I-14) are approximately equivalent to the number average primary particle diameters of the anatase-type titanium oxide particles (a1) to (a11), respectively, used as the raw materials.

"Particle diameter" for the rutile-type titanium oxide particles below in Table 4 refers to a number average primary particle diameter of corresponding rutile-type titanium oxide particles. The number average primary particle diameters of the rutile-type titanium oxide particles in the produced inks (I-1) to (I-14) are approximately equivalent to the volume median diameter (D50) of the rutile-type titanium oxide particles in the rutile-type titanium oxide particle dispersions (B1) to (B11), respectively, used as raw materials shown in Table 2. Also, the volume median diameters ($D_{50}$) of the rutile-type titanium oxide particles in the rutile-type titanium oxide particle dispersions (B1) to (B11) used for production of the inks (I-1) to (I-14) are approximately equivalent to the number average primary particle diameters of the rutile-type titanium oxide particles (b1) to (b11), respectively, used as the raw materials.

(K value) of each of the white solid images in the CIE color space were measured using a reflectance densitometer ("RD-19", product of X-Rite Inc). The measurement was carried out in a state in which each sheet of the recording medium was placed on a sheet of opacity test paper (black paper). The respective measurement values obtained as above were taken as a pre-correction L* value, pre-correction b* value, and pre-correction K value.

Next, an unused sheet of the recording medium (a sheet of the recording medium with the white solid image not formed thereon) was placed on a sheet of the opacity test paper and a laminate was prepared. Using the aforementioned reflectance densitometer, the lightness index (L* value), chromaticness index (b* value), and image density (K value) of the laminate in the CIE color space were measured. The respective measurement values obtained as above were taken as a base L* value, base b* value, and base K value.

Next, a corrected L* value and a corrected b* value were obtained by applying the pre-correction L* value, the pre-correction b* value, the base L* value, and the base b* value to the following formulas. The corrected L* value and the corrected b* value are true measurement values obtained by

TABLE 4

| | | Anatase-type titanium oxide particles | | | Rutile-type titanium oxide particles | | |
| | Ink | Particle diameter [nm] | Proportion [% by mass] | a/b | Particle diameter [nm] | Proportion [% by mass] | a/b |
|---|---|---|---|---|---|---|---|
| Comparative Example 1 | I-1 | 100 | 25 | 7 | 130 | 75 | 7 |
| Example 1 | I-2 | 150 | 25 | 7 | 170 | 75 | 7 |
| Example 2 | I-3 | 330 | 25 | 7 | 330 | 75 | 7 |
| Comparative Example 2 | I-4 | 350 | 25 | 7 | 350 | 75 | 7 |
| Comparative Example 3 | I-5 | 250 | 15 | 7 | 250 | 85 | 7 |
| Example 3 | I-6 | 250 | 20 | 7 | 250 | 80 | 7 |
| Example 4 | I-7 | 250 | 35 | 7 | 250 | 65 | 7 |
| Comparative Example 4 | I-8 | 250 | 40 | 7 | 250 | 60 | 7 |
| Comparative Example 5 | I-9 | 250 | 25 | 1 | 250 | 75 | 1 |
| Example 5 | I-10 | 250 | 25 | 3 | 250 | 75 | 3 |
| Example 6 | I-11 | 250 | 25 | 2 | 250 | 75 | 5 |
| Example 7 | I-12 | 250 | 25 | 5 | 250 | 75 | 12 |
| Example 8 | I-13 | 170 | 25 | 7 | 330 | 75 | 7 |
| Example 9 | I-14 | 330 | 25 | 7 | 170 | 75 | 15 |

<Evaluation>

With respect to each of the inks of Examples 1 to 9 and Comparative Examples 1 to 5, preservation stability and whiteness, opacity, glossiness, and surface smoothness of images formed with the ink were evaluated by the following methods. Evaluation was carried out at a temperature of 25° C. and a relative humidity of 50% unless otherwise stated. The evaluation results are shown below in Tables 5 and 6.

[Evaluation Apparatus]

As an evaluation apparatus, an inkjet recording apparatus (prototype produced by KYOCERA Document Solutions Japan Inc.) with a line head as a recording head mounted therein was used. An evaluation target (any of the inks of Examples 1 to 9 and Comparative Examples 1 to 5) was loaded into the recording head of the evaluation apparatus. As a recording medium, sheets of PET film ("LUMIRROR (registered Japanese trademark) S10 #50", product of Toray Industries, Inc., polyester film) were used.

[Whiteness and Opacity]

Using the evaluation apparatus, a white solid image with a size of 150 mm×200 mm was formed on each of five sheets of the recording medium. Next, the formed white solid images were dried sufficiently. Next, the lightness index (L* value), chromaticness index (b* value), and image density removing influence of the recording medium and the opacity test paper from the pre-correction L* value and the pre-correction b* value, respectively. Furthermore, an opacity was calculated by applying the pre-correction K value and the base K value to the following formula.

$$\text{Corrected } L^* \text{ value} = \text{pre-correction } L^* \text{ value} - \text{base } L^* \text{ value}$$

$$\text{Corrected } b^* \text{ value} = \text{pre-correction } b^* \text{ value} - \text{base } b^* \text{ value}$$

$$\text{Opacity} = 100 \times (1 - \text{pre-correction } K \text{ value/base } K \text{ value})$$

The measurement was carried out on each of the five white solid images formed on the five sheets of the recording medium. The averages of the five corrected L* values, five corrected b* values, and five opacity values were taken as an average L* value, average b* value, and average opacity, respectively. A lightness (average L* value) of at least 80 was taken as a pass (OK), and a lightness of less than 80 was taken as a failure (NG). A yellowness (average b* value) of greater than −3.0 and less than 1.0 was taken as a pass (OK), and a redness of no greater than −3.0 or at least 1.0 was taken as a failure (NG). Whiteness and opacity were evaluated according to the following criteria.

(Criteria of Whiteness)

A (good): passed in both lightness (average L* value) and yellowness (average b* value)

B (poor): failed in at least one of lightness (average L* value) and yellowness (average b* value)

(Criteria of Opacity)

A (particularly good): average opacity of 90% or more

B (good): average opacity of greater than 85% and no greater than 90%

C (poor): average opacity of less than 85%

[Glossiness]

Using the evaluation apparatus, a white solid image with a size of 150 mm×200 mm was formed on each of five sheets of the recording medium. Next, the formed white solid images were dried sufficiently. Next, the glossiness of each of the white solid images was measured using a gloss meter (product of Elcometer). The measurement was carried out at 3 randomly selected locations on the white solid image at a measurement angle of 60 degrees. The average of the measured three measurement values was taken as a glossiness of the white solid image being a target.

The measurement was carried out on each of the 5 white solid images formed on the 5 sheets of the recording medium. The average of the resultant five glossiness values was taken as an average glossiness. Glossiness was evaluated according to the following criteria.

(Criteria of Glossiness)

A (particularly good): average glossiness of at least 90

B (good): average glossiness of at least 70 and less than 90

C (poor): average glossiness of less than 70

[Surface Smoothness]

In evaluation of surface smoothness, a cyan ink was prepared first. In detail, a cyan pigment dispersion (cyan pigment concentration: 50% by mass) was prepared according to the same method as that for preparing the anatase-type titanium oxide particle dispersion (A1) in all aspects other than that the same amount of a cyan pigment ("HELIO-GENDBLUE 7088", product of BASF, C.I. Pigment Blue 15:3) was used instead of the anatase-type titanium oxide particles (a1).

Next, 30.0 parts by mass of propylene glycol, 10.0 parts by mass of triethylene glycol monobutyl ether, 1.0 part by mass of a surfactant ("SURFYNOL (registered Japanese trademark) 104", product of Nissin Chemical Industry Co., Ltd., acetylene glycol surfactant), 0.5 parts by mass of a 1% by mass sodium hydroxide aqueous solution, 8.0 parts by mass of the cyan pigment dispersion (containing 4.0 parts by mass of the cyan pigment), 11.7 parts by mass of the aforementioned binder resin particle dispersion (containing binder resin particles 3.5 parts by mass), and water were weighted into a beaker. The amount of the water used was an amount that gave the mass of the beaker contents 100.0 parts by mass in total. The beaker contents were stirred at a rotational speed of 400 rpm using a stirrer ("THREE-ONE MOTOR BL-600", product of Shinto Scientific Co., Ltd.) to uniformly mix the beaker contents, thereby obtaining a mixed liquid. The mixed liquid was filtered using a filter (pore size 5 μm) to remove foreign matter and coarse particles contained in the mixed liquid. Through the above, a cyan ink was obtained.

Using the evaluation apparatus, a white solid image with a size of 150 mm×200 mm was formed on each of five sheets of the recording medium. Next, the formed white solid images were dried sufficiently. Next, the cyan ink was loaded into the line head as a recording head of the evaluation apparatus. Next, a thin line was formed with the cyan ink on each of the white solid images on the five sheets of the recording medium using the evaluation apparatus. The formed thin line was visually observed to check the presence or absence of distortion. When a white solid image has low surface smoothness, distortion occurs in a formed thin line. Surface smoothness of the white solid image was evaluated according to the following criteria.

(Criteria of Surface Smoothness)

A (good): No distortion occurred in thin line.

B (poor): Distortion occurred in thin line.

[Preservation Stability]

An evaluation target (any of the inks of Examples 1 to 9 and Comparative Examples 1 to 5) was loaded into a container with a lid and left to stand for 1 month. After the leaving to stand, tilting stirring was carried out 50 times against the container with the lid. After 20 tilting stirrings and 50 tilting stirrings, the container contents were visually observed to check the presence or absence of precipitate. The titanium oxide particles and the like will precipitate in an evaluation target with low preservation stability if left to stand, and will not readily redisperse even with stirring. Therefore, the presence or absence of the precipitate indicates a level of preservation stability of the evaluation target. Preservation stability was evaluated according to the following criteria.

(Criteria of Preservation Stability)

A (particularly good): No precipitate was present after 20 tilting stirrings.

B (good): Precipitate was present after 20 tilting stirrings but not after 50 tilting stirrings.

C (poor): Precipitate was present after 50 tilting stirrings.

TABLE 5

| | | Whiteness | | | | | Opacity | |
| | | lightness | Yellowness | | | | Average | |
| | Ink | L* | Pass/ fail | b* | Pass/ fail | Rat- ing | opacity [%] | Rat- ing |
|---|---|---|---|---|---|---|---|---|
| Comparative Example 1 | I-1 | 73 | B | −2.8 | A | B | 80 | C |
| Example 1 | I-2 | 80 | A | −2.3 | A | A | 87 | B |
| Example 2 | I-3 | 91 | A | 0.5 | A | A | 92 | A |
| Comparative Example 2 | I-4 | 90 | A | 0.5 | A | A | 88 | B |
| Comparative Example 3 | I-5 | 92 | A | 1.2 | B | B | 97 | A |
| Example 3 | I-6 | 91 | A | 1.0 | A | A | 95 | A |
| Example 4 | I-7 | 82 | A | −1.9 | A | A | 90 | B |
| Comparative Example 4 | I-8 | 78 | B | −2.2 | A | B | 85 | C |
| Comparative Example 5 | I-9 | 90 | A | 0.8 | A | A | 93 | A |
| Example 5 | I-10 | 90 | A | 0.5 | A | A | 92 | A |
| Example 6 | I-11 | 90 | A | 0.8 | A | A | 93 | A |
| Example 7 | I-12 | 90 | A | 0.5 | A | A | 92 | A |
| Example 8 | I-13 | 88 | A | −0.5 | A | A | 93 | A |
| Example 9 | I-14 | 85 | A | −1.0 | A | A | 90 | B |

TABLE 6

| | | Glossiness | | Surface smooth- ness | Preser- vation stability |
| | Ink | Mea- surement value | Rating | | |
|---|---|---|---|---|---|
| Comparative Example 1 | I-1 | 135 | A | A | A |
| Example 1 | I-2 | 130 | A | A | A |
| Example 2 | I-3 | 125 | A | A | A |

TABLE 6-continued

| | Ink | Glossiness | | Surface smooth-ness | Preser-vation stability |
|---|---|---|---|---|---|
| | | Mea-surement value | Rating | | |
| Comparative Example 2 | I-4 | 122 | A | A | C |
| Comparative Example 3 | I-5 | 115 | A | A | A |
| Example 3 | I-6 | 115 | A | A | A |
| Example 4 | I-7 | 115 | A | A | A |
| Comparative Example 4 | I-8 | 115 | A | A | A |
| Comparative Example 5 | I-9 | 52 | C | B | A |
| Example 5 | I-10 | 72 | B | A | A |
| Example 6 | I-11 | 80 | B | A | A |
| Example 7 | I-12 | 125 | A | A | A |
| Example 8 | I-13 | 90 | A | A | A |
| Example 9 | I-14 | 135 | A | A | A |

As shown in Tables 1 to 6, each of the inks of Examples 1 to 9 contained titanium oxide particles and an aqueous medium. The titanium oxide particles had a number average primary particle diameter of at least 140 nm and no greater than 340 nm. The ratio of the major axis length to the minor axis length of the titanium oxide particles was at least 2 and no greater than 17. The titanium oxide particles included anatase-type titanium oxide particles and rutile-type titanium oxide particles. The anatase-type titanium oxide particles had a percentage content of at least 17.50% by mass and no greater than 37.50% by mass in the titanium oxide particles. The rutile-type titanium oxide particles had a percentage content of at least 72.50% by mass and no greater than 82.50% by mass in the titanium oxide particles. The inks of Examples 1 to 9 had excellent preservation stability and formed images with high whiteness, opacity, glossiness, and surface smoothness.

By contrast, both the anatase-type titanium oxide particles and the rutile-type titanium oxide particles had a number average primary particle diameter of less than 140 nm in the ink (I-1) of Comparative Example 1. That is, the titanium oxide particles in the ink (I-1) had a number average primary particle diameter of less than 140 nm. The ink (I-1), of which the titanium oxide particles had a particle diameter that was too small, formed images with insufficient lightness and opacity.

Both the anatase-type titanium oxide particles and the rutile-type titanium oxide particles in the ink (I-4) of Comparative Example 2 had a number average primary particle diameter of greater than 340 nm. That is, the titanium oxide particles in the ink (I-4) had a number average primary particle diameter of greater than 340 nm. The ink (I-4), of which the titanium oxide particles had a particle diameter that was too large, was rated as poor in preservation stability.

In the titanium oxide particles of the ink (1-5) of Comparative Example 3, the anatase-type titanium oxide particles had a percentage content of less than 17.50% by mass and the rutile-type titanium oxide particles had a percentage content of greater than 82.50% by mass. The ink (I-5) formed yellowish images due to an insufficient amount of the anatase-type titanium oxide particles and an excessive amount of the rutile-type titanium oxide particles.

In the titanium oxide particles of the ink (I-8) of Comparative Example 4, the anatase-type titanium oxide particles had a percentage content of greater than 37.50% by mass and the rutile-type titanium oxide particles had a percentage content of less than 72.50% by mass. The ink (I-8) formed images with insufficient lightness and opacity due to an excessive amount of the anatase-type titanium oxide particles and an insufficient amount of the rutile-type titanium oxide particles.

In the ink (1-9) of Comparative Example 5, both of the ratios of the major axis length to the minor axis length of the rutile-type titanium oxide particles and the anatase-type titanium oxide particles were less than 2. That is, the ink (I-9) had a ratio of the major axis length to the minor axis length of the titanium oxide particles of less than 2. The ink (I-9), which contained spherical titanium oxide particles, formed images with insufficient glossiness and surface smoothness.

What is claimed is:

1. A white ink for inkjet printing, comprising:
titanium oxide particles; and
an aqueous medium, wherein
the titanium oxide particles are dispersed into the aqueous medium,
the titanium oxide particles include anatase-type titanium oxide particles and rutile-type titanium oxide particles,
the anatase-type titanium oxide particles have a percentage content of at least 17.50% by mass and no greater than 37.50% by mass in the titanium oxide particles,
the rutile-type titanium oxide particles have a percentage content of at least 72.50% by mass and no greater than 82.50% by mass in the titanium oxide particles,
both the anatase-type titanium oxide particles and the rutile-type titanium oxide particles have a number average primary particle diameter of at least 140 nm and no greater than 340 nm, and
a ratio of major axis length to minor axis length of the anatase-type titanium oxide particles and a ratio of major axis length to minor axis length of the rutile-type titanium oxide particles each are at least 2 and no greater than 17.

2. The white ink for inkjet printing according to claim 1, wherein
the number average primary particle diameter of the rutile-type titanium oxide particles is greater than the number average primary particle diameter of the anatase-type titanium oxide particles.

3. The white ink for inkjet printing according to claim 1, wherein
the ratio of the major axis length to the minor axis length of the rutile-type titanium oxide particles is at least 3 and no greater than 17.

4. The white ink for inkjet printing according to claim 1, wherein
the ratio of the major axis length to the minor axis length of the anatase-type titanium oxide particles is at least 3 and no greater than 17.

5. The white ink for inkjet printing according to claim 1, further comprising
a pigment dispersion resin.

6. The white ink for inkjet printing according to claim 1, further comprising
binder resin particles.

7. The white ink for inkjet printing according to claim 1, wherein
the white ink for inkjet printing is used for front printing.

8. The white ink for inkjet printing according to claim 1, wherein
the anatase-type titanium oxide particles have a percentage content of at least 22.00% by mass and no greater than 32.00% by mass in the titanium oxide particles, the rutile-type titanium oxide particles have a percentage content of at least 68.00% by mass and no greater than 78.00% by mass in the titanium oxide particles, the anatase-type titanium oxide particles have a number average primary particle diameter of at least 165 nm and no greater than 300 nm, the rutile-type titanium oxide particles have a number average primary particle diameter of at least 140 nm and no greater than 340 nm, and the number average primary particle diameter of the rutile-type titanium oxide particles is greater than the number average primary particle diameter of the anatase-type titanium oxide particles.

\* \* \* \* \*